US008639551B1

(12) United States Patent
Feng et al.

(10) Patent No.: US 8,639,551 B1
(45) Date of Patent: Jan. 28, 2014

(54) METHOD AND SYSTEM FOR WORKFORCE RELATED RESOURCE PLANNING

(75) Inventors: Qi Feng, Palo Alto, CA (US); Cipriano Santos, Palo Alto, CA (US); Dirk Beyer, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1566 days.

(21) Appl. No.: 11/496,948

(22) Filed: Jul. 31, 2006

(51) Int. Cl.
*G06Q 10/00* (2012.01)
*G06Q 10/06* (2012.01)

(52) U.S. Cl.
CPC .............. *G06Q 10/063118* (2013.01)
USPC ........................................... 705/7.17

(58) Field of Classification Search
USPC ........................................ 705/7–10
See application file for complete search history.

(56) References Cited

U.S. PATENT DOCUMENTS

| | | | | | |
|---|---|---|---|---|---|
| 5,289,368 | A | * | 2/1994 | Jordan et al. ................ | 705/7.13 |
| 5,325,292 | A | * | 6/1994 | Crockett ..................... | 705/7.18 |
| 5,911,134 | A | * | 6/1999 | Castonguay et al. ........ | 705/7.12 |
| 5,918,207 | A | * | 6/1999 | McGovern et al. .......... | 705/321 |
| 6,049,776 | A | * | 4/2000 | Donnelly et al. ............ | 705/7.14 |
| 6,275,812 | B1 | * | 8/2001 | Haq et al. .................... | 705/7.14 |
| 6,820,060 | B1 | * | 11/2004 | Eisner ......................... | 705/7.31 |
| 6,857,020 | B1 | * | 2/2005 | Chaar et al. ................. | 709/226 |
| 6,985,872 | B2 | * | 1/2006 | Benbassat et al. .......... | 705/7.14 |
| 7,155,399 | B2 | * | 12/2006 | Andre et al. ................. | 705/7.14 |
| 7,225,141 | B2 | * | 5/2007 | Calderaro et al. ........... | 705/7.14 |
| 7,539,627 | B2 | * | 5/2009 | Schmidt ...................... | 705/7.16 |
| 7,644,013 | B2 | * | 1/2010 | Nastacio et al. ............. | 705/26.1 |
| 7,650,293 | B2 | * | 1/2010 | Kiran et al. .................. | 705/7.25 |
| 7,676,490 | B1 | * | 3/2010 | Cassone et al. .............. | 707/805 |
| 7,954,106 | B2 | * | 5/2011 | Kern et al. ................... | 718/104 |
| 8,041,616 | B2 | * | 10/2011 | Cullen et al. ................ | 705/35 |
| 8,165,906 | B2 | * | 4/2012 | Gerhard et al. ............. | 705/7.13 |
| 8,335,705 | B2 | * | 12/2012 | Ehrler et al. ................. | 705/7.15 |
| 2001/0049615 | A1 | * | 12/2001 | Wong et al. ................. | 705/8 |
| 2002/0143599 | A1 | * | 10/2002 | Nourbakhsh et al. ....... | 705/9 |
| 2002/0188430 | A1 | * | 12/2002 | Benny et al. ................ | 703/7 |
| 2002/0188485 | A1 | * | 12/2002 | Benny et al. ................ | 705/7 |
| 2002/0188493 | A1 | * | 12/2002 | Benny et al. ................ | 705/9 |
| 2002/0188739 | A1 | * | 12/2002 | Benny et al. ................ | 709/230 |
| 2002/0198766 | A1 | * | 12/2002 | Magrino et al. ............. | 705/11 |
| 2003/0083891 | A1 | * | 5/2003 | Lang et al. .................. | 705/1 |
| 2003/0125996 | A1 | * | 7/2003 | Bush et al. .................. | 705/7 |
| 2003/0182173 | A1 | * | 9/2003 | D'Elena et al. ............. | 705/9 |
| 2003/0229529 | A1 | * | 12/2003 | Mui et al. .................... | 705/8 |
| 2004/0002887 | A1 | * | 1/2004 | Fliess et al. ................. | 705/9 |
| 2004/0162748 | A1 | * | 8/2004 | Vogel et al. ................. | 705/8 |
| 2004/0162749 | A1 | * | 8/2004 | Vogel et al. ................. | 705/8 |
| 2004/0162753 | A1 | * | 8/2004 | Vogel et al. ................. | 705/8 |
| 2005/0004825 | A1 | * | 1/2005 | Ehrler et al. ................ | 705/8 |
| 2005/0004828 | A1 | * | 1/2005 | deSilva et al. .............. | 705/9 |
| 2005/0010456 | A1 | * | 1/2005 | Chang et al. ................ | 705/7 |
| 2005/0096961 | A1 | * | 5/2005 | Schaaf et al. ............... | 705/9 |
| 2005/0222899 | A1 | * | 10/2005 | Varadarajan et al. ....... | 705/11 |
| 2005/0240465 | A1 | * | 10/2005 | Kiran et al. ................. | 705/10 |
| 2006/0080156 | A1 | * | 4/2006 | Baughn et al. .............. | 705/7 |
| 2006/0167706 | A1 | * | 7/2006 | Kenyon et al. .............. | 705/1 |
| 2006/0235740 | A1 | * | 10/2006 | Lea et al. .................... | 705/10 |

(Continued)

*Primary Examiner* — Brett Feeney

(57) ABSTRACT

A method and system of workforce related resource planning is disclosed. The method includes receiving workforce related resource data wherein the workforce related resource data includes demand data and supply data, disaggregating the demand data and the supply data and creating a probability distribution of a workforce gap between the demand data and supply data to quantify risk associated with workforce related resource planning.

20 Claims, 3 Drawing Sheets

(56) References Cited

U.S. PATENT DOCUMENTS

| | | | |
|---|---|---|---|
| 2006/0259338 A1* | 11/2006 | Rodrigue et al. | 705/7 |
| 2007/0005414 A1* | 1/2007 | Connors et al. | 705/9 |
| 2007/0027810 A1* | 2/2007 | Longnecker et al. | 705/51 |
| 2007/0073576 A1* | 3/2007 | Connors et al. | 705/10 |
| 2007/0124186 A1* | 5/2007 | Virine | 705/8 |
| 2007/0143764 A1* | 6/2007 | Kern et al. | 718/104 |
| 2007/0219837 A1* | 9/2007 | Lu et al. | 705/8 |
| 2007/0294406 A1* | 12/2007 | Suer et al. | 709/226 |
| 2008/0004933 A1* | 1/2008 | Gillespie | 705/9 |
| 2008/0066072 A1* | 3/2008 | Yurekli et al. | 718/104 |
| 2008/0183527 A1* | 7/2008 | Deitrich et al. | 705/7 |
| 2008/0183545 A1* | 7/2008 | Deitrich et al. | 705/8 |

* cited by examiner

METHOD AND SYSTEM FOR WORKFORCE RELATED RESOURCE PLANNING

FIELD OF THE INVENTION

The present invention relates generally to the field of workforce planning/management and more particularly to a method and system for workforce related resource planning.

BACKGROUND OF THE INVENTION

In most conventional workforce planning systems, an average future workforce requirement is estimated according to a historical trend and planned accordingly. The forecast of the future workforce requirement is usually generated from capturing the trend and random pattern of the historical workforce requirement. A workforce demand curve is then extended to a future time. Such an approach is very powerful, when the nature of the requirement is relatively stable (i.e. the evolution of the industry takes long relative to the planning horizon) and when highly integrated information systems are available. However, such models cannot adequately analyze the workforce requirements the today's staffing managers face, such as demand and supply uncertainty.

In a rapid maturing and growing market, historical data many not be viable and many not reflect the new trends in business. For example, in a business with frequent technological innovation, historical data may not accurately depict how the market requirement is going to change with a newly emerging technology and the associated project management.

Forecasting workforce demand is quite challenging. A common approach is to assess a probability that demand would be realized and when this probability exceeds a threshold, managers identify the workforce available to satisfy that demand. Using this method, a target probability is set and then the total workforce requirement for projects with the winning probability above the target, are evaluated. This approach though simple to implement and common in practice, can lead to a poor availability level of workforce.

In particular this problem occurs at IT consulting and integration services where there is a funnel of project opportunities, but there is uncertainty about the acquisition of each project. For example, if the threshold winning probability is set to 75%, a project manager plans to hire staff for project bids with a 75% probability of being accepted. However, project bids below this threshold are not staffed. Consequently, by ignoring all projects in the funnel with lower probabilities, the true workforce requirement is typically underestimated. Additionally, this type of workforce planning does not really reflect the uncertainties involved in the workforce requirement planning.

Accordingly, what is needed is a method and system that addresses the problems related to the management of the workforce requirement. The method and system should be simple, cost effective and capable of being easily adapted to existing technology.

DETAILED DESCRIPTION

The present invention relates to a method and system for workforce related resource planning. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

Varying embodiments of a method and system for workforce related resource planning are disclosed. Workforce related resources includes, but is not limited to, workforce supply and workforce related equipment such as computers, cubicles, office space, administrative supplies, etc. The method and system employ a probabilistic analysis of a gap in workforce data associated with the workforce supply and the workforce demand (requirement). Accordingly, the method and system in accordance with the varying below described embodiments are designed to help quantify the risk in workforce requirement planning and evaluate the gaps between the supply and demand of workforce related resources.

Figure 1:
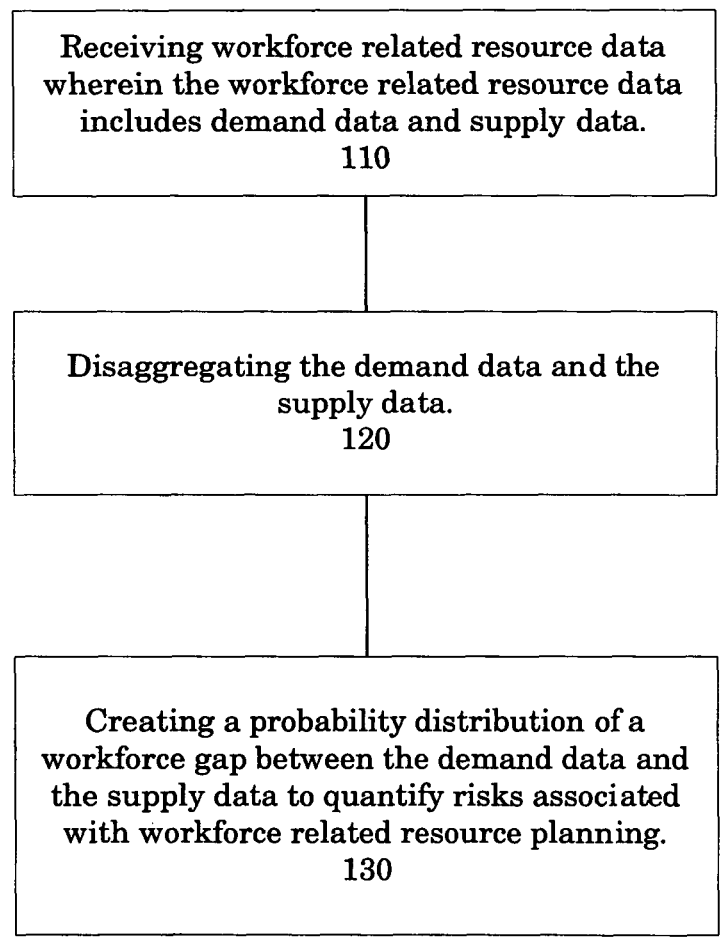
FIG. 1 is a high-level flow chart of a method in accordance with an embodiment of the present invention.

FIG. 1 is a high-level flow chart of a method in accordance with an embodiment. A first step 110 includes receiving workforce related resource data wherein the workforce related resource data includes demand data and supply data. In an embodiment, the workforce related resource data includes a compilation of all of the existing potential projects. A second step 120 includes disaggregating the demand data and the supply data. In an embodiment, this step involves analyzing the demand data and the supply data based on uncertainties associated therewith. A third step 130 includes creating a probability distribution of a workforce gap between the demand data and supply data to quantify risks associated with workforce related resource planning. In an embodiment, the workforce gap represents a difference between the amount of resources required to meet a specified service level and the amount of resources available. This term will be explained in more detailed later in the specification.

In an embodiment, demand data includes data associated with the amount of resources needed to fulfill a resource requirement for projects in the project funnel. This data can be based on gathered sales information or any of a variety of resource requirement indicators. Additionally, supply data includes data associated with the amount of resources available to fulfill the resource requirement of the projects in the project funnel.

Figure 2:
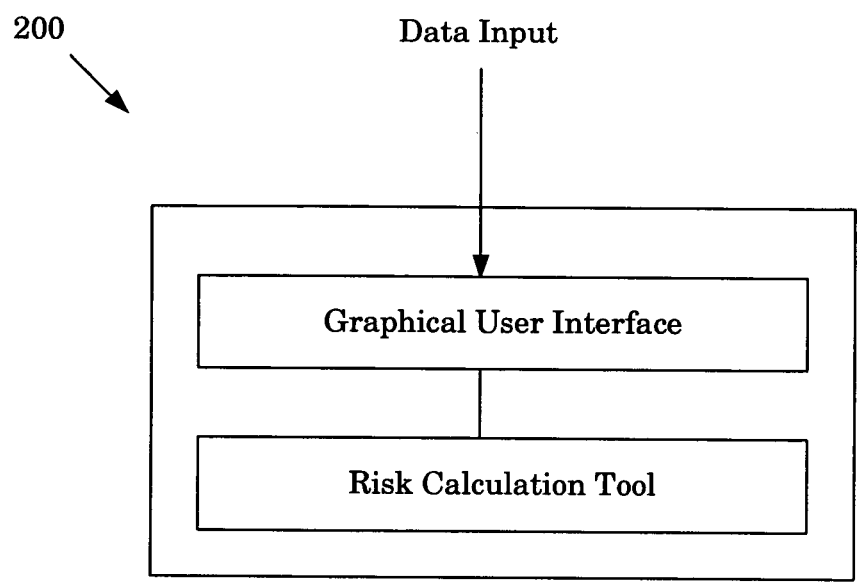
FIG. 2 is an illustration of a system for assessing risk associated with the staffing of a project funnel in accordance with an embodiment of the present invention.

FIG. 2 is an illustration of a system 200 for assessing risk associated with the staffing of a project funnel in accordance with an embodiment. System 200 includes a graphical user interface 202 and a risk calculation tool 204. A graphical user interface includes a combination of menus, screen design, keyboard commands and command language, which creates the way a user interacts with a computer. Although the above-disclosed embodiment is described as being utilized in conjunction with a graphical user interface, one of ordinary skill in the art will readily recognize that any of a variety of user interfaces could be implemented while remaining within the spirit and scope of the present invention.

In an embodiment, the risk calculation tool 204 is Excel-based. Excel is a full featured spreadsheet program for computer systems from Microsoft®. It has the capability to link many spreadsheets for consolidation and provides a wide variety of business graphics and charts for creating presentation materials. However, one of ordinary skill in the art will readily recognize that a variety of computer programs could be utilized. Accordingly, the risk calculation tool 204 utilizes the below described statistical formulas to operate on received project funnel data in order to quantify risk associated with workforce related resource planning. Accordingly, system 200 may be implemented as one or more respective software modules operating on a computer system.

The above-described embodiment of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention.

This computer readable media may comprise, for example, RAM contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (for example, a conventional "hard drive" or a RAID array), magnetic tape, electronic read-only memory, an optical storage device (for example, CD ROM, WORM, DVD, digital optical tape), or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

In the development of the above-disclosed embodiments, the dynamics of workforce planning as well as the uncertainties associated therewith are considered. Workforce planning under uncertainty can be done based on a set of project opportunities currently under consideration or negotiation with customers. This plurality of project opportunities can be referred to as the project funnel and typically spans over a time horizon of several months. Although more information about these opportunities becomes available as these opportunities mature, there is a significant amount of uncertainty about whether or not the project(s) will be won and the exact start time of the project.

Workforce planning under uncertainty is quite challenging. On the one hand, workforce demand and its timing generated from the funnel is highly uncertain. On the other hand, there is also uncertainty about workforce supply due to attrition, limited availability of skilled workers in the market, and even no-shows amongst those who accepted employment offers. Thus, the main challenge faced is to balance between workforce utilization and availability.

The main sources of uncertainty for workforce demand are: uncertainty about winning a project opportunity, uncertainty about the starting period of a project won, and the uncertainty about the replacement requirements of workforce assigned to on-going projects that leave the company due to attrition. The main sources of uncertainty for workforce supply are: uncertainty about attrition of idle employees, uncertainty about the number of people we can hire, and uncertainty about the period where employees will be released from on-going projects.

For each project opportunity in the funnel, workforce demands are calculated for each skill set required if the project is won. To model the demand uncertainty, a probability distribution of the total workforce requirements is computed at each period of the planning horizon. To model the supply uncertainty, a probability distribution of the total workforce available is computed at each period of the planning horizon. A probability of a workforce gap is then computed at each period of the planning horizon. In an embodiment, the workforce gap is the difference between workforce required and the workforce available. Recommendations can then be made about the number of offers to make for each skill required at each period in the planning horizon in order to meet a specified service level requirement. The output is a hiring plan across all skill sets and periods.

Based on the implementation of this algorithm, risk related questions can be answered about demand, supply, and gaps. For example, the use of the algorithm allows answers to be provided for the following questions:

What is the probability that 5 or more Java programmers will be needed at a given period of the planning horizon?

What is the probability that 5 or more Java programmers will be available at a given period of the planning horizon?

If we make 5 offers for Java programmers, what is the probability of having a gap of 2 people or less at a given period of the planning horizon?

How many Java programmers are needed over a four month planning horizon in order to satisfy 75% of the practice opportunities?

If the attrition rate is reduced by 1% what is the impact on gaps exposure ?

Figure 3:
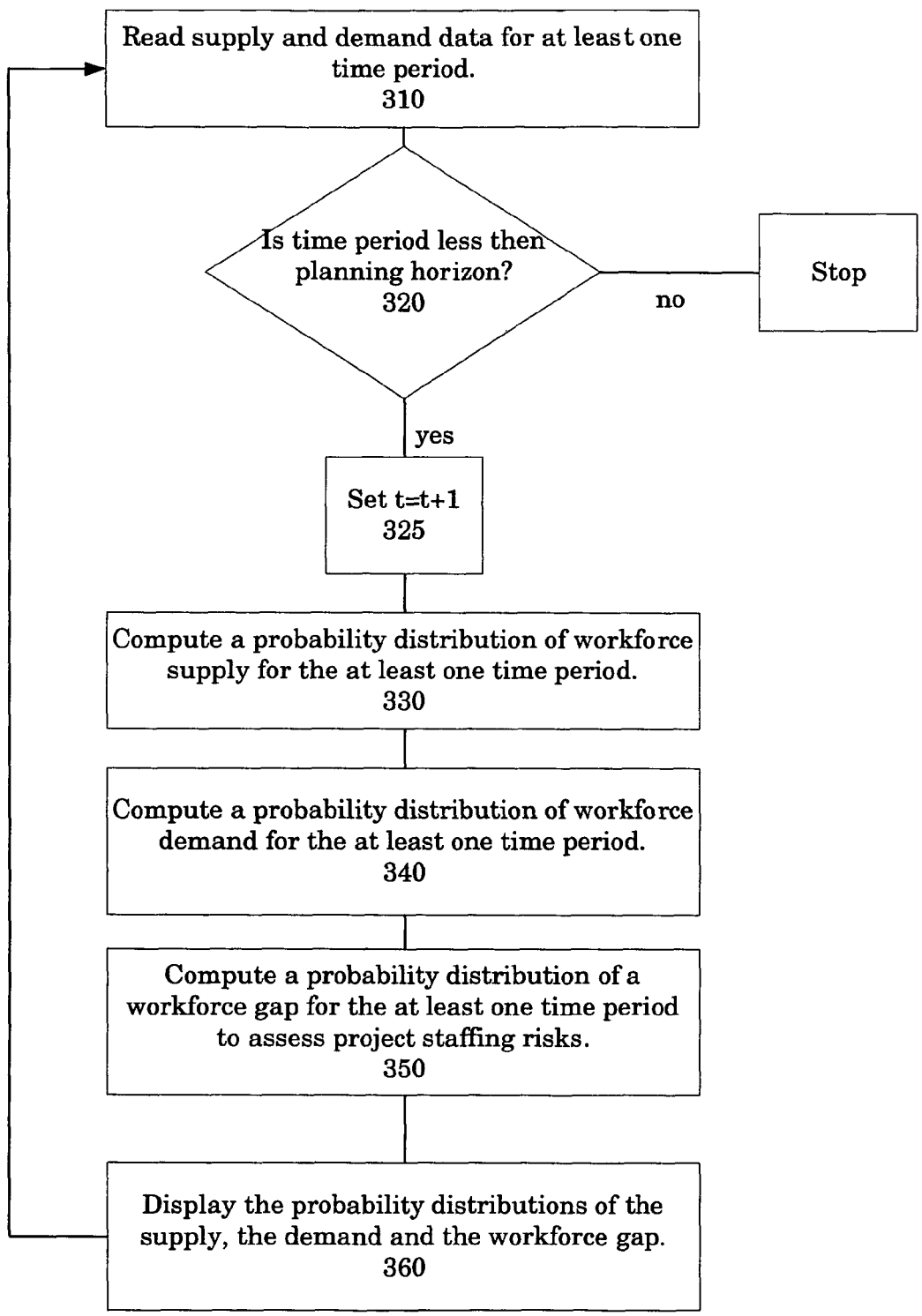
FIG. 3 is a flow chart of an algorithm that could implemented in accordance with an embodiment of the present invention.

For a better understanding, FIG. 3 is a flow chart of an algorithm that could implemented in accordance with an embodiment. Step 310 includes reading supply and demand data for at least one time period. In an embodiment, the supply and demand data is disaggregated into the appropriate planning unit (e.g. skill set and geographical location). Here the time t is set to zero.

In an embodiment, step 310 includes reading supply and demand data for at least one time period. What should be understood here is that each project will needs a number of people of a certain skill during a certain time in the life of the project. Accordingly, a user inputs the different skill and start time requirements. The winning probability and start time distributions are then given at the project level and translated into requirement probabilities in every period of the project and every skill. As a result, the demand can be described with the following set of inputs for each project/skill combination:

Skill ID.

Project opportunity ID.

$x_i^t$: Number of people required by project opportunity/Skill combination i at period t.

$\tau(i)$: Duration of project opportunity i, which is the number of periods that people with required skill will be assigned to project.

$p_i$: Probability of winning project opportunity i.

$\phi_{i,t}$: Probability of starting project i at period t of planning horizon.

Supply data is derived from records of current assignments of the employees:

Skill ID.

$S_0$: Workforce with skill available at the beginning of the planning horizon.

$y_i^t$: Workforce with skill that will be released from project i at period t.

$q_{i,t}$: Probability that people with skill will be released from project i at period t.

α: Attrition rate.

θ: Probability of accepting an offer $h_t$: number of offers to be made in period t l: Hiring lead time.

Step 320 is a determination step wherein if time period is less than planning horizon T, set t=t+1. Otherwise, go to step 330.

It should be understood that the calculations of the workforce needed, the workforce available and the calculations associated with the workforce gap are done separately for each skill. Accordingly, in what follows, the index indicating the specific skill is omitted. Step 330 includes computing a probability distribution of supply for a specified time period. The dynamics of the workforce supply can be expressed by the following formula:

$$S_t = Z_t + R_t + H_t$$

Where:

$S_t$: A random variable describing the workforce available during period t.

$Z_t$: A random variable describing the workforce available from previous period that decided to stay in the company, i.e. workforce available from previous period after attrition. This group of people can be referred to as survivors.

$R_t$: A random variable describing the workforce released from on-going projects and available at period t.

$H_t$: A random variable describing the number people that accepted offer in period t−l and become available at period t, where l is the hiring lead-time.

Given the workforce available in period t−1, the probability distribution of survivors is computed at period t. Assuming that each employee decides independently about leaving her job, $Z_t$ has a binomial distribution conditioning over the support of $S_{t-1}$.

$$Pr(Z_t = n) = \sum_{\substack{s_{t-1} \geq n \\ s_{t-1} \in Sup(S_{t-1})}} \binom{s_{t-1}}{n} * \alpha^{s_{t-1}-n}(1-\alpha)^n * Pr(S_{t-1} = s_{t-1})$$

$$n = 0, 1, \ldots s_{max}$$

where 1−α is the probability of staying in the company, and $s_{max}$ is the maximum value in the support of $S_{t-1}$.

The probability distribution of number of people released at period t is then computed as the convolution of workforce released at period t from all on-going projects i.

$$R_t = \sum_i Y_i^t$$

The workforce released by project i at period t is a random variable $Y_i^t$. The probability distribution of workforce released by project i at period t is $$Pr\{Y_i^t\} = \begin{cases} q_{i,t} & Y_i^t = y_i^t \\ 1 - q_{i,t} & Y_i^t = 0 \end{cases}$$

where $y_i^t$ is the amount of workforce is released by project i at period t, and $q_{i,t}$ is the probability that $y_i^t$ employees are released at period t. Finally, compute the probability distribution of people hired at period t as a binomial distribution considering acceptance rate and number of offers made as follows:

$$Pr(H_t = n) = \binom{h_{t-l}}{n} * \theta^n (1-\theta)^{h_{t-l}-n}$$

$$n = 0, 1, \ldots, h_{t-l}$$

where $h_{t-l}$ offers are made at period t−l and l is the lead-time to hire.

Consequently, the probability distribution of the workforce supply during period t is computed recursively as the convolution of two random variables[1] wherein the parenthesis show an order where these convolutions can be done $$S_t = ([Z_t + R_t] + H_t)$$

It should be noted that the convolution of two integer random variables X and Y is defined as:

$$P(X + Y = z) = \sum_{i=-\infty}^{\infty} P(X = i)P(Y = x - i)$$

Step 340 includes computing a probability distribution of demand for a specified time period. The dynamics of workforce demand can be expressed by the following formula $$D_t = X^t + A_t^{rep}$$

where:

$X^t$: Total workforce requirement at period t.

$A_t^{rep}$: The replacement requirements is the workforce assigned to on-going projects that leave the company due to attrition at period t.

The probability distribution of the workforce requirements is computed at period t as the convolution of workforce required at period t from all on-going projects i, $$X^t = \sum_i X_i^t$$

Accordingly, the workforce required by project opportunity i at period t has the following probability distribution:

$$Pr\{X_i^t\} = \begin{cases} \pi_{i,t} & X_i^t = x_i^t \\ 1 - \pi_{i,t} & X_i^t = 0 \end{cases}$$

where $x_i^t$ is the amount of workforce required by project opportunity i at period t, and $\pi_{i,t}$ is the probability that $x_i^t$ employees are required by project opportunity i at period t. The probability of workforce requirements by project at period is then computed as follows:

Let $p_{i,t} = \phi_{i,t} * p_i$ be the probability of winning opportunity i and starting the project at period t. The probability distribution of workforce requirements from project i in period t can be computed as follows:

$$\pi_{i,t} = \sum_{\tau = max(t-\tau(i)+1,1)}^{t} p_{i,\tau}$$

where τ(i) is the duration of opportunity i. The summation ranges over all periods for which, if the opportunity had started in that period, it would still be active in period t. The new probability distribution considers the duration of the opportunities in order to take into account the positive probability of workforce requirements that started at previous periods and that have not yet been completed at current period. Observe that this new distribution of workforce requirements from opportunity i at the first period is simply $\pi_{i,1}=p_{i,1}$.

The probability distribution of the workforce replacement requirements, $A_t^{rep}$ is then computed. It is assumed that $A_t^{rep}$ is a random variable that has a Binomial distribution; where $n^{as\ sgn}$, the workforce assigned to on-going projects represents the number of trials of the Binomial distribution; and a-attrition rate of assigned employees, is the probability that an assigned employee to an on-going project will leave the company. Hence $$Pr(A_t^{rep} = k) = \binom{n^{assgn}}{k} * a^k (1-a)^{n^{assgn}-k}$$

$$k = 0, 1, \ldots, n^{assgn}$$

Consequently, the probability distribution of the workforce required during period t is computed as the convolution of two random variables, $$D_t = X^\tau + A_t^{rep}$$

Step 350 includes computing a probability distribution of gap for period for a specified time period. The gap $G_t$ is a random variable defined as the difference between workforce requirements and workforce available at each period. Hence $G_t=D_t-S_t$, for periods t=1, 2, ... T. This again is the sum of the two independent random variables $D_t$ and $(-S_t)$. Therefore, the convolution of these two variables are calculated.

A final step 360 includes outputting the probability distributions of the supply, the demand and the workforce gap for each period. The probability distribution of supply, demand and gap for each period can be displayed in different forms. The most typical are:

A table of probabilities $p_{t,n}$ that the random variable assumes the value n in period t A bar chart for each period depicting the probability that the random variable assumes the value n A line chart for each period depicting the cumulative distribution function, i.e. the probability that the random variable assumes a value of n or less Accordingly, step 460 provides a quantitative description of the resource situation for each skill. This description can be used, for example, to answer the above-delineated questions related to staffing. In addition, by calculating the probability distribution of the gap for different hiring strategies $(h_t)_{t=1\ldots T}$, the number of people to extend an employment offer to in order to meet probabilistic service level requirements can be calculated wherein the probability that the gap is zero or less is a natural way to express the service level in a given skill.

The above-described model can be used as a quick tool for what-if analysis and quantifying the impact of certain outcomes, e.g. winning or losing a particular project. Moreover, this model is extendable. The demand information is censored by analyzing funnel requirement because funnel requirement only takes into account the observed potential opportunities. Accordingly, when historical requirement data become available, dummy variables can be added to calibrate the demand trend and obtain a complete demand forecast.

Without further analysis, the foregoing so fully reveals the gist of the present invention that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

What is claimed:

1. A method for workforce related resource planning, comprising:

receiving, by a computer system, workforce related resource data associated with a planning horizon having a plurality of time periods, wherein the workforce related resource data includes demand data and supply data; and creating, by the computer system, a probability distribution of a workforce gap between the demand data and the supply data for each of the time periods to quantify risks associated with the workforce related resource planning, wherein the probability distribution of the workforce gap is based on a probability distribution of demand calculated from:

a probability distribution of workforce requirements during a given period based on probabilities of workforce required by corresponding project opportunities and probabilities of winning the corresponding project opportunities; and a probability distribution of workforce replacement requirements based on a distribution of workforce assigned to projects and a probability of attrition of workforce assigned to the projects.

2. The method of claim 1, wherein the probability distribution of workforce requirements is further based on at least one of a probability of starting a project opportunity at the given period, a probability distribution of a project duration, and a probability distribution of resource requirements, and wherein the supply data comprises an uncertainty associated with at least one of an attrition probability, a probability of accepting an offer, and a probability of employees released from on-going projects at the given period.

3. The method of claim 1, further comprising disaggregating the demand data and the supply data based on skill.

4. The method of claim 1, wherein creating the probability distribution of the workforce gap between the demand data and the supply data comprises:

computing a probability distribution of supply for the given period; and computing the probability distribution of the workforce gap that is based on a difference between the probability distribution of demand for the given period and the probability distribution of supply for the given period, wherein the probability distribution of the workforce gap includes probabilities that a variable will have corresponding different values in the given period.

5. The method of claim 4, wherein computing the probability distribution of supply comprises computing the probability distribution of supply based on a probability that a person with a particular skill will be released from a given project at a given time.

6. The method of claim 5, wherein computing the probability distribution of supply comprises computing the probability distribution of supply further based on a probability that a person given an offer will accept the offer.

7. The method of claim 4, wherein the workforce related resource data further includes data associated with workforce related equipment.

8. The method of claim 4, further comprising:
calculating a number of job offers to extend in order to satisfy a specified service level based on the probability distribution of the workforce gap.

9. A method for providing workforce related resource planning services, comprising:
receiving a target level of service;
determining, by a computer system, a workforce related resource requirement for the target level of service; and
providing, by the computer system, a probability distribution of achieving the target level of service based on the workforce related resource requirement, the probability distribution being based on a probability distribution of demand calculated from:
a probability distribution of workforce requirements during a given period based on probabilities of workforce required by corresponding project opportunities and probabilities of winning the corresponding project opportunities; and
a probability distribution of workforce replacement requirements based on a distribution of workforce assigned to projects and a probability of attrition of workforce assigned to the projects.

10. The method of claim 9, wherein the workforce related resource requirement is based on demand data and supply data.

11. The method of claim 10, wherein determining the workforce related resource requirement for the target level of service comprises:
disaggregating the demand data and the supply data based on skill and time period.

12. The method of claim 10, wherein providing the probability distribution of achieving the target level of service based on the workforce related resource requirement comprises:
computing a probability distribution of supply for the given period; and
computing the probability distribution of a workforce gap that is based on a difference between the probability distribution of demand for the given period and the probability distribution of supply for the given period, wherein the probability distribution of the workforce gap includes probabilities that a variable will have corresponding different values in the given period.

13. The method of claim 12, further comprising:
calculating a number of job offers to extend in order to satisfy the target level of service based on the probability distribution of the workforce gap.

14. A non-transitory computer-readable storage medium for workforce related resource planning, the computer-readable medium having instructions stored thereon which, when executed, cause a computer to:
receive workforce related resource data associated with a planning horizon having a plurality of time periods, wherein the workforce related resource data includes demand data and supply data; and
create a probability distribution of a workforce gap between the demand data and supply data for each of the time periods to quantify risks associated with the workforce related resource planning, wherein the probability distribution of the workforce gap is based on a probability distribution of demand calculated from:
a probability distribution of workforce requirements during a given period based on probabilities of workforce required by corresponding project opportunities and probabilities of winning the corresponding project opportunities; and
a probability distribution of workforce replacement requirements based on a distribution of workforce assigned to projects and a probability of attrition of workforce assigned to the projects.

15. The computer-readable storage medium of claim 14, wherein the probability distribution of workforce requirements is further based on at least one of a probability of starting a project opportunity at the given period, a probability distribution of a project duration, and a probability distribution of resource requirements, and
wherein the supply data comprises an uncertainty associated with at least one of an attrition probability, a probability of accepting an offer, and a probability of employees released from on-going projects at the given period.

16. The computer-readable storage medium of claim 15, wherein the instructions when executed cause the computer to further disaggregate the demand data and the supply data based on time period and skill.

17. The computer-readable storage medium of claim 14, wherein creating the probability distribution of the workforce gap between the demand data and the supply data comprises:
computing a probability distribution of supply for the given period; and
computing the probability distribution of the workforce gap that is based on a difference between the probability distribution of demand for the given period and the probability distribution of supply for the given period, wherein the probability distribution of the workforce gap includes probabilities that a variable will have corresponding different values in the given period.

18. The computer-readable storage medium of claim 17, wherein computing the probability distribution of supply comprises computing the probability distribution of supply based on a probability that a person with a particular skill will be released from a given project at a given time.

19. The computer-readable storage medium of claim 18, wherein computing the probability distribution of supply comprises computing the probability distribution of supply further based on a probability that a person given an offer will accept the offer.

20. The computer-readable storage medium of claim 17, wherein the instructions when executed cause the computer to further:
calculate a number of job offers to extend in order to satisfy a specified service level based on the probability distribution of the workforce gap.

* * * * *